United States Patent Office 3,379,661
Patented Apr. 23, 1968

3,379,661
MOLDING COMPOSITION CONTAINING A SATURATED ALICYCLIC GUANAMINE AND CURED ARTICLES OF IMPROVED STAIN RESISTANCE AND LIGHT RESISTANCE THEREOF
Gilbert M. Gynn, Hilliard, and Palmer B. Stickney, Columbus, Ohio, assignors to Plastics Manufacturing Company, Dallas, Tex., a corporation of Texas
No Drawing. Filed Oct. 21, 1965, Ser. No. 500,180
6 Claims. (Cl. 260—17.3)

ABSTRACT OF THE DISCLOSURE

A thermosetting composition for molding light-fast tableware articles having improved coffee stain resistance, comprising cellulose impregnated with a co-condensation product of formaldehyde with melamine and a saturated alicyclic guanamine.

Background of the invention

This invention relates to the production of articles of improved stain resistance comprising synthetic resins of the melamine-formaldehyde type.

One of the more important commercial uses of synthetic resins of the melamine-formaldehyde type is the production of molded dinnerware such as cups, plates and saucers. Dinnerware molded from melamine-formaldehyde compositions has been produced in large quantities during recent years because of its superior durability. However, further expansion of the market for melamine-formaldehyde dinnerware has been seriously impeded by the fact that such dinnerware is subject to staining and loss of lustre during use. This deficiency of melamine-formaldehyde dinnerware has been a severe limitation upon the acceptance of such dinnerware, particularly for use in restaurants and institutions. In the use of such dinnerware in restaurants and institutions, each piece of dinnerware is used more frequently than in household use so that staining and loss of lustre are accelerated. This deficiency has limited the use of melamine-formaldehyde dinnerware in restaurants and institutions, although such dinnerware otherwise is ideally suited for use in restaurants and institutions because of its durability.

United States Patent No. 2,579,985, issued Dec. 25, 1951, disclosed a modified molding composition of the melamine-formaldehyde type. The modification which was disclosed in that patent consisted in the use of benzoguanamine in place of some of the melamine employed in preparing the molding composition, so that the molding composition disclosed in that patent contained reaction products of formaldehyde with both melamine and benzoguanamine, instead of reaction products of formaldehyde with melamine alone. Patent No. 2,579,982 disclosed that articles molded from a melamine-benzoguanamine-formaldehyde molding composition had approximately three times the stain resistance and thus approximately three times the useful life of articles molded from standard melamine-formaldehyde molding compositions. However, articles molded from a melamine-benzoguanamine-formaldehyde molding composition are subject to severe yellowing upon exposure to light.

Little success has been encountered heretofore in searching for another guanamine which could be used in combination with melamine for reaction with formaldehyde to produce improved molding compositions. Among the guanamines that are readily available, many are found to produce no improvement when substituted for part of the melamine used in preparing a melamine-formaldehyde molding composition. Other guanamines, like benzoguanamine, when used in combination with melamine for reaction with formaldehyde in producing a molding composition, result in molded articles which become yellow upon exposure to light.

Summary of the invention

The principal object of the invention is the production of molded articles, such as dinnerware, which not only have superior stain resistance but also are substantially free from yellowing upon exposure to light. More specific objects and advantages are apparent from the following description, which discloses and illustrates but is not intended to limit the invention.

The present invention is based upon the discovery that when part of the melamine used in preparing a melamine-formaldehyde molding composition is replaced with a saturated alicyclic guanamine, the resulting composition produces molded articles which are not subject to yellowing upon exposure to light. Although saturated alicyclic guanamines thus are free from the disadvantages of benzoguanamine, it has been found that saturated alicyclic guanamines act like benzoguanamine to reduce stain resistance when substituted for part of the melamine used in preparing a melamine-formaldehyde molding composition.

Description of the preferred embodiments

The alicyclic guanamines used in the practice of the present invention must be saturated. The presence of a carbon-to-carbon double bond in an alicyclic guanamine which is used to replace part of the melamine employed in preparing a melamine-formaldehyde molding composition has been found to result in molded articles of unsatisfactory light resistance.

Preparation of saturated alicyclic guanamine

A saturated alicyclic guanamine may be prepared by reacting acrylonitrile or methacrylonitrile with a diene to produce an unsaturated alicyclic nitrile, which is then hydrogenated and reacted with dicyandiamide in a hydroxylated solvent such as ethylene glycol or ethylene glycol monomethyl ether, or in liquid ammonia under pressure (preferably in admixture with methanol), in the presence of a strongly basic catalyst such as potassium hydroxide, sodium hydroxide or metallic sodium.

When acrylonitrile and butadiene are used as, the starting materials in this procedure, the final product obtained after reaction with dicyandiamide is hexahydrobenzoguanamine. When isoprene is used in this procedure instead of butadiene, the final product is a mixture of 3-methyl hexahydrobenzoguanamine and 4-methyl hexahydrobenzoguanamine. The use of cyclopentadiene in place of butadiene results in the production of 3,6-endomethylene hexahydrobenzoguanamine. If methacrylonitrile is used in place of the arcrylonitrile, the final product has a methyl substituent in the 1-position on the cycloaliphatic ring.

Reaction with formaldehyde

In the practice of the present invention, formaldehyde is reacted with both melamine and a saturated alicyclic guanamine. For reasons of economy, the molar ratio of the guanamine to melamine preferably is not greater than about 2:1. Preferably the molar ratio is at least 1:10. In the reaction with formaldehyde, the ratio of the mols of formaldehyde to total mols of melamine and guanamine may range from about 1.3:1 to about 3:1.

In the practice of the present invention, a mixture of melamine and a saturated alicyclic guanamine may be reacted with formaldehyde by the procedures conventionally used for reacting melamine and formaldehyde. Ordinarily the first step consists in dissolving the melamine and the guanamine in a commercial aqueous formaldehyde solution containing 37 percent by weight of formaldehyde. The pH of the formaldehyde solution should be adjusted in advance, for example by the addition of a base such as sodium hydroxide, so that the pH of the initial clear reaction solution is between 6 and 9, preferably about 8. The reaction may be carried out by refluxing until a stable solution is obtained.

Often it is desirable to add water at the start of the reaction in order to produce a solution of the desired concentration.

If the molar ratio of the guanamine to melamine used for the reaction is more than about 1:3, it may be desirable to add a small amount of a hydroxylated solvent such as isopropyl alcohol or t-butyl alcohol to minimize precipitation of the formaldehyde reaction product.

Production of cured articles

A composition which is in the form of an aqueous solution comprising a reaction product of formaldehyde with melamine and a saturated alicyclic guanamine, having a solids content of about 50 to 60 percent, may be used to impregnate a cellulose filler, such as bleached sulfite pulp, in such a proportion that the dried impregnated filler contains about 25 to 35 percent of the filler. If a darker color is not objectionable, wood flour may be used as the filler. Other cellulosic fillers which may be employed include ground wood pulp, cotton linters and regenerated cellulose fiber. After the solution has been mixed thoroughly with the shredded or ground filler, the mixture may be dried with air circulation at about 200–240° F. for 40–60 minutes.

The dried product may be mixed with the usual additives and ground in a ball mill or hammer mill to produce a molding composition. The additives may include pigments, lubricants such as zinc stearate, and acidic materials such as phthalic anhydride to promote cure in the mold.

Example 1

3,6-endomethylene tetrahydrobenzonitrile, having a boiling point of 49–51° C. at 2.0–2.5 mm. of mercury, was obtained by vacuum distillation of a reaction mixture prepared by mixing equal mols of acrylonitrile and cyclopentadiene, allowing the mixture to reflux without external heating, and then allowing it to stand for several hours. The nitrile thus obtained was then hydrogenated at pressures up to about 1000 pounds per square inch, using a palladium-on-carbon catalyst, to produce 3,6-endomethylene hexahydrobenzonitrile.

In order to obtain hexahydrobenzonitrile, the foregoing procedure was repeated, using acrylonitrile and butadiene as the starting materials (5 mols of each). In this case, in order to promote the reaction, the reactants were charged into a 1-liter stirred autoclave together with 17 grams of hydroquinone. The mixture was stirred and heated to 250° F. during a period of 105 minutes, and was then held at that temperature for six and one-half hours. The tetrahydrobenzonitrile obtained by vacuum distillation, before hydrogenation, had a boiling point of 53–56° C. at about 3 mm. of mercury.

Each of the two saturated alicyclic nitriles thus obtained was converted to the corresponding guanamine by the following procedure: Two mols of the nitrile and two mols of dicyandiamide were added to a solution of 25.9 grams of potassium hydroxide in 400 ml. of ethylene glycol monomethyl ether in a 2-liter, 3-neck flask equipped with a stirrer, thermometer, reflux condenser and electric heating mantle. The reaction mixture was refluxed for five hours, and the resulting slurry was then cooled to room temperature, mixed with about 3 liters of water and neutralized with acetic acid. The solids were then filtered out and washed thoroughly with water and a small amount of alcohol, and the resulting guanamine was dried in a vacuum oven at about 100° C.

A 500-ml. 3-neck flask equipped with a reflux condenser, stirrer and thermometer was charged with a 37-percent aqueous solution of formaldehyde and an additional quantity of water. After the solution had been warmed to about 49° C., a guanamine prepared as hereinbefore described was added. The mixture was then heated for about 10 minutes to produce a solution, and melamine was then added. The resulting solution, which at this point had a pH of about 8, was then refluxed with stirring until cloudiness developed upon addition of two or three drops of the solution to 50 ml. of water at 37.8° C. The period of refluxing was several minutes, and at the end of this period the solution was cooled to room temperature. It was assumed that during the reaction one mol of water was split off for every three mols of formaldehyde, and the amount of the additional quantity of water added at the beginning of the reaction was such that the solids content of the final reaction product was about 50 percent.

The solution thus prepared, after the addition of a sufficient amount of lactic acid to bring the pH of the solution between 6 and 7, was used to impregnate a sheet of paper of the type which is employed commercially as a surface lamination in the molding of dinnerware from melamine-formaldehyde molding compositions. The impregnated paper was then dried for about 80 seconds at 275 to 280° F. The dried product, which contained from about 65 to about 70 percent by weight of the reaction product, was used as a surface lamination in the molding of a plate from a commercial alpha cellulose-filled melamine-formaldehyde molding composition. A pre-heated preform of the molding composition was first molded at a temperature of 315° F. and under a pressure of about 3000 pounds per square inch for 45 seconds, and the mold was then opened and the impregnated paper placed on top of the molded piece. The mold was then closed to hold the piece at the same pressure and temperature for 120 seconds, and the finished piece was then ejected from the mold. The molded plate thus produced was tested by immersing it for 65 hours in a test bath which had been prepared by adding instant coffee to water an amount equal to one teaspoon of coffee per cup of water. The bath was maintained during the test at a temperature between 90 and 100° C.

After removal from the test bath, the plate was washed with soap and water and dried, and the final color of the laminated surface of the plate was compared with its initial color to determine the amount of darkening which had occurred during immersion in the coffee solution. The color of the plate was measured before and after immersion on the Rd scale of a Gardner color difference meter, which represents white by 100 Rd units and black by zero Rd units.

Another plate produced by the same procedure was exposed to ultraviolet light for 24 hours in an Atlas carbon arc Fade-O-Meter. The color of the laminated surface of this plate was measured before and after exposure to ultraviolet light, and the change in color was determined as a change in units on the "$b$" scale of a Gardner color difference meter, which indicates an increase in yellowness as an increase in the "$b$" value.

In order to demonstrate the improvement in light stability achieved in the practice of the present invention, plates were prepared by the foregoing procedure, using hexahydrobenzoguanamine. Control plates were prepared by the same procedure, using benzoguanamine. In each case, the molar proportions of the reactants were in the ratio of 2.2 mols of formaldehyde to 0.4 mol of melamine and 0.6 mole of guanamine. Other control plates were produced by the same procedure, omitting the guanamine and using 2 mols of formaldehyde for 1 mol of melamine. Table 1 below shows the degree of yellowing in ultraviolet light and the degree of staining in coffee solution which occurred when these plates were tested as hereinbefore described.

TABLE 1

[2.2 mols CH$_2$O, 0.4 mol melamine, 0.6 mol guanamine]

| Guanamine | Yellowing in Ultraviolet Light | Staining in Coffee Solution |
|---|---|---|
| Hexahydrobenzoguanamine | −1.6 | 14.4 |
| Benzoguanamine | +5.0 | 21.9 |
| None (2.0 mols CH$_2$O, 1.0 mol melamine) | −1.2 | 59.0 |

Table 2 below shows the results of tests of a series of plates produced by a procedure that was the same as the procedure used in producing the plates of Table 1, except that in the plates used for the tests of Table 2 the molar proportions of the reactants consisted of 1.4 mols of formaldehyde to 0.75 mol of melamine and 0.25 mol of guanamine. Table 2 also shows the results of tests of control plates produced by a procedure which was the same except that the guanamine was omitted, 1.4 mols of formaldehyde being used for each mol of melamine.

TABLE 2

[1.4 mols of CH$_2$O, 0.75 mol melamine, 0.25 mol guanamine]

| Guanamine | Yellowing in Ultraviolet Light | Staining in Coffee Solution |
|---|---|---|
| Hexahydrobenzoguanamine | −1.3 | 21.4 |
| Benzoguanamine | +4.8 | 16.9 |
| None (1.4 mol CH$_2$O, 1.0 mol melamine) | −1.0 | 45.0 |

Tables 3, 4 and 5 below show that hexahydrobenzoguanamine gave somewhat better resistance to coffee staining than 3,6-endomethylene hexahydrobenzoguanamine. The plates used for the tests reported in the following tables were produced by a procedure which was the same as that hereinbefore described except that in the plates of Table 3 the molar proportions of the reactants were 1.4 mols of formaldehyde to 0.85 mol of melamine and 0.15 mol of guanamine; in the plates of Table 4 the molar proportions of the reactants were 1.8 mols of formaldehyde to 0.75 mol of melamine and 0.25 mol of guanamine; and in the plates of Table 5 the molar proportions of the reactants on the one hand consisted of 2.2 mols of formaldehyde to 0.6 mol of melamine and 0.4 mol of hexahydrobenzoguanamine, and on the other hand consisted of 2.2 mols of formaldehyde to 0.65 mol of melamine and 0.35 mol of 3,6-endomethylene hexahydrobenzoguanamine.

TABLE 3

[1.4 mols CH$_2$O, 0.85 mol melamine, 0.15 mol guanamine]

| Guanamine | Yellowing in Ultraviolet Light | Staining in Coffee Solution |
|---|---|---|
| Hexahydrobenzoguanamine | −0.7 | 21.4 |
| 3,6-endomethylene hexahydrobenzoguanamine | −1.4 | 34.0 |

TABLE 4

[1.8 mols CH$_2$O, 0.75 mol melamine, 0.25 mol guanamine]

| Guanamine | Yellowing in Ultraviolet Light | Staining in Coffee Solution |
|---|---|---|
| Hexahydrobenzoguanamine | −1.0 | 18.9 |
| 3,6-endomethylene hexahydrobenzoguanamine | −1.2 | 25.0 |

TABLE 5

[2.2 mols CH$_2$O, 0.6–0.65 mol melamine, 0.35–0.4 mol guanamine]

| Guanamine | Yellowing in Ultraviolet Light | Staining in Coffee Solution |
|---|---|---|
| Hexahydrobenzoguanamine | −1.1 | 23.5 |
| 3,6-endomethylene hexahydrobenzoguanamine | −1.0 | 28.1 |

EXAMPLE 2

An aqueous solution prepared by reaction with formaldehyde in accordance with the procedure of Example 1, having a temperature of about 150° F., was mixed with shredded alpha cellulose, and the mixture was dried in a circulating-air oven at about 220° F. for about one hour. The proportions used were such that the dried product contained about 30 percent by weight of alpha cellulose.

After the dried product had been cooled to room temperature, it was ground in a ball mill with about 1.0 percent of its weight of phthalic anhydride and about 0.7 percent of its weight of zinc stearate. Test plates were produced by molding the ground material for about two minutes under a pressure of about 3000 pounds per square inch and at a temperature of about 320° F.

Table 6 below shows the results of testing plates so produced, by the test procedure described in Example 1. The molar proportions of the reactants used for producing these plates consisted of 2.0 mols of formaldehyde, 0.5 mol of melamine and 0.5 mol of guanamine. The control plates were made by the same procedure, omitting the guanamine and using 2.0 mols of formaldehyde for each mol of melamine.

TABLE 6

[2.0 mols CH$_2$O, 0.5 mol melamine, 0.5 mol guanamine]

| Guanamine | Yellowing in Ultraviolet Light | Staining in Coffee Solution |
|---|---|---|
| Hexahydrobenzoguanamine | +3.5 | 5.6 |
| Benzoguanamine | +13.4 | 10.8 |
| None (2.0 mols CH$_2$O, 1.0 mol melamine) | +3.1 | 52.4 |

Having described the invention, we claim:

1. A thermosetting composition for molding light-fast tableware articles having improved coffee stain resistance, comprising from 25 to 35 parts of cellulose impregnated with from 65 to 75 parts of a co-condensation product of formaldehyde with melamine and a saturated alicyclic guanamine of the class consisting of hexahydrobenzoguanamine and substituted-hexahydro benzoguanamines having from one to two substituents of the class consisting of methyl and endomethylene, the molar ratio of the guanamine to melamine being from 1:10 to 2:1, and said composition being capable of producing light-fast tableware articles whose coffee stain resistance is superior to that of articles produced from a composition consisting of cellulose impregnated with a condensation product of formaldehyde with melamine alone.

2. A thermosetting composition according to claim 1 wherein the guanamine is hexahydrobenzoguanamine.

3. A thermosetting composition according to claim 1 wherein the guanamine is 3,6-endomethylene hexahydrobenzoguanamine.

4. A tableware article having improved light resistance and coffee stain resistance, comprising from 25 to 35 parts of cellulose impregnated with from 65 to 75 parts of a cured co-condensation product of formaldehyde with melamine and a saturated alicyclic guanamine of the class consisting of hexahydrobenzoguanamine and substituted-hexahydro benzoguanamines having from one to two substitutents of the class consisting of methyl and endomethylene, the molar ratio of the guanamine to melamine being from 1:10 to 2:1, and the coffee stain resistance of said article being superior to that of an article consisting of cellulose impregnated with a cured condensation product of formaldehyde with melamine alone.

5. A tableware article according to claim 4 wherein the guanamine is hexahydrobenzoguanamine.

6. A tableware article according to claim 4 wherein the guanamine is 3,6-endomethylene hexahydrobenzoguanamine.

References Cited
UNITED STATES PATENTS

| | | | |
|---|---|---|---|
| 3,082,180 | 3/1963 | Boldizar et al. | 260—67.6 |
| 2,579,985 | 12/1951 | Varela et al. | 260—17.3 |
| 2,781,553 | 3/1957 | Varela et al. | 260—67.6 |
| 2,859,188 | 11/1958 | Heider et al. | 260—67.6 |

WILLIAM H. SHORT, *Primary Examiner.*

E. M. WOODBERRY, *Assistant Examiner.*